Figure 1:
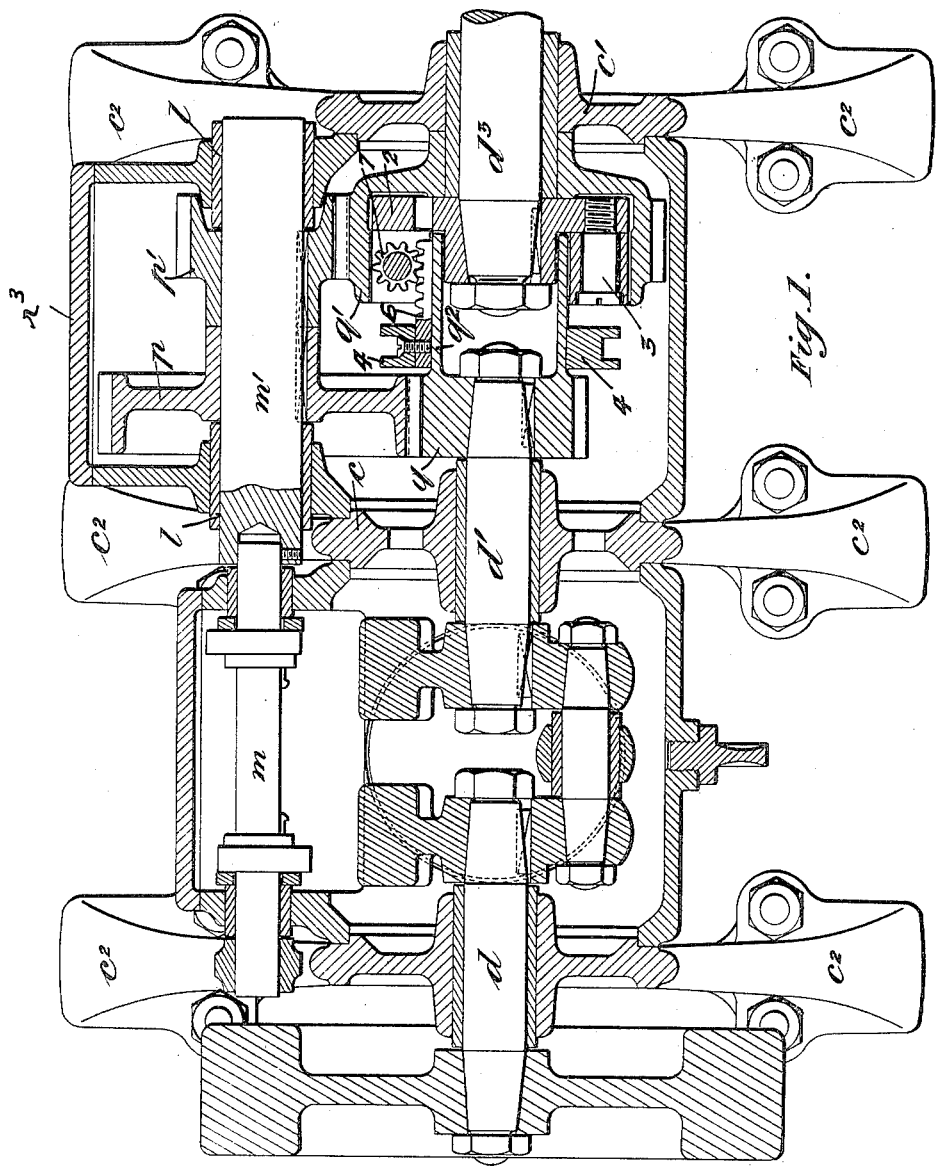

No. 660,083.

Patented Oct. 16, 1900.

W. E. SIMPSON.
VARIABLE SPEED GEARING.
(Application filed May 23, 1900.)

(No Model.)

2 Sheets—Sheet 1.

Witnesses,

Inventor.
William E. Simpson
by
F. L. Middleton
Attys.

No. 660,083. Patented Oct. 16, 1900.
W. E. SIMPSON.
VARIABLE SPEED GEARING.
(Application filed May 23, 1900.)
(No Model.) 2 Sheets—Sheet 2.
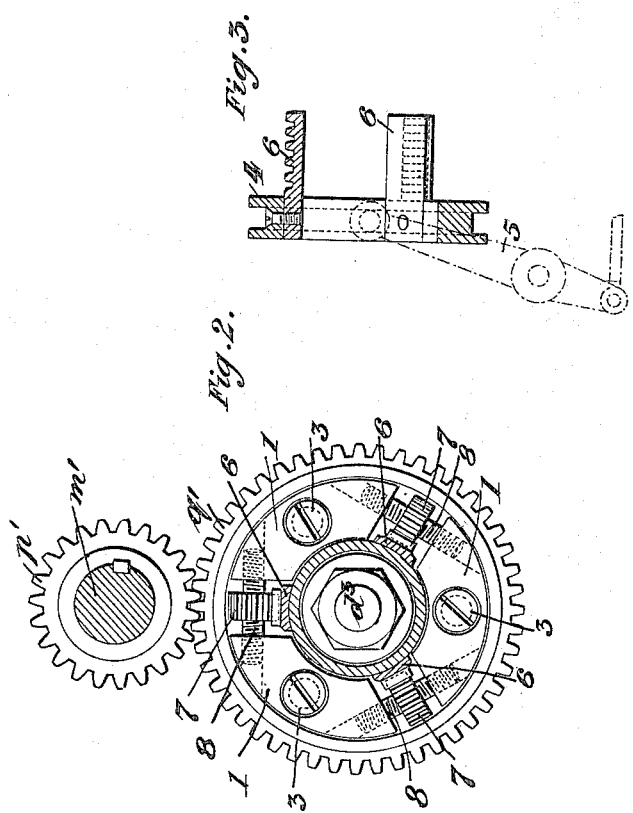
Witnesses:
C. Middleton
L. B. Middleton
Inventor,
William E. Simpson,
by
H. L. Middleton
Attys.

UNITED STATES PATENT OFFICE.

WILLIAM EDMUND SIMPSON, OF LONDON, ENGLAND.

VARIABLE-SPEED GEARING.

SPECIFICATION forming part of Letters Patent No. 660,083, dated October 16, 1900.

Application filed May 23, 1900. Serial No. 17,744. (No model.)

*To all whom it may concern:*

Be it known that I, WILLIAM EDMUND SIMPSON, a subject of the Queen of England, and a resident of 28 Victoria street, Westminster, London, England, have invented certain new and useful Improvements in Variable-Speed Gearing, (for which I have applied for a patent in Great Britain, No. 12,136, bearing date June 10, 1899,) of which the following is a specification.

The object of the invention is to provide an improved arrangement of variable-speed gearing for use in connection with motors having the "Otto" cycle of operation, whereby such gearing may be of simpler and cheaper construction and self-contained within the motor, so as not to require separate foundations or framing, though not necessarily limited to such use.

The invention is illustrated in the accompanying drawings, in which—

Figure 1 is a longitudinal sectional plan of a casing with a variable-speed gearing provided in accordance with the invention. Fig. 2 is a detailed front elevation of the clutch, and Fig. 3 is a side sectional elevation of the operating-racks employed.

In carrying the invention into effect, as illustrated in the drawings, a section $m'$, of the usual half-speed cam-shaft $m$, and the pair of gear-wheels $p$ $q$ are made of such strength as to be capable of transmitting the whole power of the motor, and on the section $m'$ of the cam-shaft is mounted a third pinion or wheel $p'$, and the section $m'$ of the cam-shaft is carried within bearings $l$ in the box or framing $r^3$, which is bolted to the adjacent crank-chamber through the cover $c$, by which it is also carried at one side and is carried at the other side by the end cover $c'$. Each of the covers $c$ and $c'$ are provided with feet or holding-brackets $c^2$, by means of which the motor and gear casing may be secured to the foundation or framing. The pinion or wheel $p'$ gears with a fourth pinion or wheel $q'$, which is mounted upon a shaft $d^3$, coaxial with the motor-shaft $d$ $d'$. Upon said shaft $d^3$ is a clutch adapted either to engage with the motor-shaft $d'$ or with the fourth pinion or wheel $q'$ in such a manner that the second shaft $d^3$ may be driven at the same speed as the motor-shaft $d$ $d'$ or at such other speed as is determined by the ratio of the third and fourth wheels $p'$ and $q'$, respectively.

The ratio of the first and second gears $p$ $q$ is two to one, or a multiple thereof—as, for instance, four to one—in which latter case the cams would be double, so as to give two four-stroke cycles per revolution of the camshaft.

The aforesaid clutch preferably consists of a disk 2, keyed on the second shaft $d^3$, a divided segmental ring 1 on said disk carried by pins 3 and split or divided in one or more places, and a grooved collar 4, adapted to be moved laterally by a lever 5 or other means upon a flanged extension $q^2$ of the pinion $q$ and having a rack or racks 6, secured to the collar 4, which gear, respectively, with pinions 7 on double-ended right and left hand screws 8, engaging within the ends of the segments of the split or divided segmental ring 1, so that when the grooved collar 4 is moved in one direction the split or divided segmental ring 1 is expanded and forced against the annular extension of the fourth wheel $q'$, while when the collar 4 is moved in the other direction the split or divided segmental ring 1 is contracted upon the extension $q^2$ of the pinion $q$. In the first case the speed of the motor is reduced through the gear $q$, $p$, $p'$, and $q'$, while in the other case the shaft $d^3$ is rotated at the same speed as the crank-shaft $d$ $d'$.

According to the construction illustrated in the drawings the split or divided segmental ring 1 is provided in three parts or segments, and a corresponding number of right and left handed screws and racks are also provided, and each of the parts or segments of the ring 1 are loosely mounted upon pins 3, so that the slight radial movement necessary is permitted.

Having now described my invention, what I claim as new, and desire to secure by Letters Patent, is—

1. In combination, a motor-shaft, a gear mounted thereon having a flanged extension, a coaxial driving-shaft, a disk mounted thereon, a gear loosely mounted upon the driving-shaft and having an internal clutch-face, a third shaft parallel with the motor and driving shafts, gears mounted thereon meshing with the gears on the motor and driving shafts, clutch members carried by the disk, and means for moving said members into engagement either with the said internal clutch-face or the flanged extension, substantially as described.

2. In combination a motor-shaft, a gear mounted thereon having a flanged extension, racks mounted upon the flanged extension, a coaxial driving-shaft, a disk mounted upon the coaxial driving-shaft and segmental parts of a ring carried thereby, right and left handed screws engaging in the opposite extremities of the said segmental parts having pinions thereon which engage with the racks aforesaid, a gear loosely mounted upon the driving-shaft having an annular portion covering the segmental ring, a third shaft parallel with the motor and driving shafts, gears mounted thereon and meshing respectively with the gears mounted upon the motor and driving shafts, for the purpose and substantially as described.

In witness whereof I have hereunto set my hand in presence of two witnesses.

WILLIAM EDMUND SIMPSON.

Witnesses:
WILLIAM EDWARD EVANS,
ANTON PAULI.